US012715587B2

(12) United States Patent
Benthien et al.

(10) Patent No.: US 12,715,587 B2
(45) Date of Patent: Aug. 25, 2026

(54) RAIL SYSTEM FOR A CABIN OF A VEHICLE

(71) Applicant: Airbus Operations GmbH, Hamburg (DE)

(72) Inventors: Hermann Benthien, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 282 days.

(21) Appl. No.: 18/364,655

(22) Filed: Aug. 3, 2023

(65) Prior Publication Data

US 2024/0051667 A1 Feb. 15, 2024

(30) Foreign Application Priority Data

Aug. 12, 2022 (EP) .................................... 22190150

(51) Int. Cl.
*B64D 11/06* (2006.01)

(52) U.S. Cl.
CPC ................................ *B64D 11/0696* (2013.01)

(58) Field of Classification Search
CPC ....... B64D 11/0696; B64C 1/18; E04B 5/023; E04B 5/10; F16B 5/01; F16B 37/122; E04F 15/02447; E04F 15/02452; E04F 15/02458
USPC ................. 248/503.1; 52/470, 463, 461, 468
See application file for complete search history.

(56) References Cited

U.S. PATENT DOCUMENTS 4,296,586 A * 10/1981 Heurteux .................. F16B 5/01 411/338
4,399,642 A * 8/1983 Bard ......................... F16B 5/01 52/483.1
5,037,259 A * 8/1991 Duran ..................... F16B 39/28 411/173
6,264,412 B1 * 7/2001 Nakamura ................ F16B 5/01 411/546
6,298,633 B1 * 10/2001 McCorkle ................. F16B 5/01 52/787.11

(Continued)

FOREIGN PATENT DOCUMENTS

| | | | |
|---|---|---|---|
| DE | 10054586 | A1 | 6/2001 |
| DE | 102019111000 | A1 | 10/2020 |
| DE | 102018122813 | B4 | 2/2021 |

OTHER PUBLICATIONS

European Search Report for corresponding European Patent Application No. 22190150 dated Jan. 19, 2023; priority document.

*Primary Examiner* — Ingrid M Weinhold
(74) *Attorney, Agent, or Firm* — Greer, Burns & Crain, Ltd.

(57) ABSTRACT

A rail system for the installation of objects in a cabin of a vehicle having a base rail, an installation rail, and connecting devices for connecting the base rail and the installation rail to one another in a mutually parallel orientation. The base rail has a bottom side, with a securing portion for securing the base rail on a structural component of the vehicle, and a top side. The installation rail has an installation surface on which the objects can be mounted and connected to the installation rail. The rail system is configured to position the installation surface with a predetermined spacing to the top side such that at least one lateral intermediate space is formed between the installation surface and the base rail for the purposes of form-fittingly holding a floor panel.

14 Claims, 7 Drawing Sheets

(56) References Cited

U.S. PATENT DOCUMENTS

| | | | | |
|---|---|---|---|---|
| 8,220,222 | B2 * | 7/2012 | Ciprian | B64C 1/12 244/118.6 |
| 10,487,864 | B2 * | 11/2019 | Schmidt | F16B 5/0621 |
| 11,753,172 | B2 * | 9/2023 | Matsuoka | B60N 2/0264 248/503.1 |
| 2005/0156095 | A1 | 7/2005 | Vichniakov et al. | |
| 2005/0211833 | A1 * | 9/2005 | Frantz | B64C 1/20 244/118.1 |
| 2008/0302060 | A1 * | 12/2008 | Ciprian | B64C 1/06 52/787.12 |
| 2017/0370469 | A1 * | 12/2017 | Roborel De Climens | F16J 15/12 |
| 2020/0086966 | A1 * | 3/2020 | Chadwell | B64D 11/0696 |
| 2020/0086967 | A1 | 3/2020 | Tiryaki et al. | |
| 2020/0339267 | A1 | 10/2020 | Benthien et al. | |
| 2020/0398990 | A1 | 12/2020 | Sasse et al. | |
| 2023/0271693 | A1 * | 8/2023 | Sullivan | B64D 11/0696 244/119 |
| 2024/0174341 | A1 * | 5/2024 | Poppe | E04B 5/10 |
| 2024/0400208 | A1 * | 12/2024 | Benthien | B60N 2/005 |

* cited by examiner

RAIL SYSTEM FOR A CABIN OF A VEHICLE

CROSS-REFERENCES TO RELATED APPLICATIONS

This application claims the benefit of the European patent application No. 22190150.7 filed on Aug. 12, 2022, the entire disclosures of which are incorporated herein by way of reference.

FIELD OF THE INVENTION

The invention relates to a rail system for the installation of objects in a cabin of a vehicle, to a vehicle cabin, and to a vehicle having at least one vehicle cabin and/or one rail system.

BACKGROUND OF THE INVENTION

Rails and rail systems are often used for securing objects in a cabin of a vehicle, in particular of an aircraft. For example, it is common for passenger seats, cabin monuments and the like to be secured on seat rails which are arranged, parallel to a longitudinal axis of the aircraft, on or in a cabin floor and which are equipped with suitable receptacles. Here, the seat rails are arranged on transverse beams of a vehicle structure and often also support floor panels. For this purpose, the floor panels are connected, for example, by way of marginal screw connections to the seat rails. A design of the seat rails having a receiving region for fixtures, in the form of a first flange, a second flange arranged spaced from the first flange, and a web extending between the flanges, can result in a highly complex and non-linear direction of a force between a floor panel, which is screwed to the seat rail, and the structure. In addition to the screw connection, a seal for preventing a passage of moisture is required at numerous points.

SUMMARY OF THE INVENTION

It is an object of the invention to propose an improved seat rail or an improved rail system which enables floor panels to be secured as easily as possible and which at the same time allows a flexible design and simplified sealing.

A rail system for the installation of objects in a cabin of a vehicle is proposed, having a base rail, an installation rail, and connecting devices for connecting the base rail and the installation rail to one another in a mutually parallel orientation, wherein the base rail has a bottom side, with a securing portion for securing the base rail on a structural component of the vehicle, and a top side, wherein the installation rail has an installation surface on which the objects can be mounted and connected to the installation rail, and wherein the rail system is configured to position the installation surface with a predetermined spacing to the top side such that at least one lateral intermediate space is formed between the installation surface and the base rail for the purposes of form-fittingly holding a floor panel.

The base rail serves as a structural base for the rail system according to the invention. The base rail is adapted for being connected to a structural component of the vehicle. For example, the vehicle structure may have multiple transverse beams which extend transversely with respect to a longitudinal axis of the vehicle structure. The base rail may be oriented parallel to the longitudinal axis and arranged on the transverse beams or other structural components. The design of the base rail may be made dependent on the design of the corresponding structural component of the vehicle. Here, it is merely necessary for the base rail to comprise a top side that is connectable to the installation rail.

The base rail may have securing portions which are spaced from the top side and which are connectable to the structural component of the vehicle by mechanical connecting means. For example, the base rail could comprise a profile cross section that extends at least substantially constantly along the main extent of the base rail. The top side could be of flat form and oriented preferably parallel to the cabin floor when the base rail is in an installed state. The profile cross section may comprise securing portions extending transversely, perpendicularly or parallel with respect to the top side, which securing portions then extend proceeding from the top side in a direction away from the cabin floor or run below the cabin floor with a spacing to the top side. The structural component could comprise a flange which is connected to an abovementioned transverse beam and connectable to the base rail.

The base rail is preferably at least partially hollow so as to have a low weight. It could be produced as a multiply bent or otherwise deformed metal sheet. The metal sheet could furthermore comprise cutouts in certain regions in order to further reduce weight. Here, however, the base rail should always be designed to have adequate strength.

The installation rail is provided for receiving the corresponding objects in the vehicle cabin, that is to say, fixing them at an intended position, accommodating weight and mass forces originating from the objects, and directing such forces into the structure of the vehicle. The installation rail and the base rail together form a single rail, wherein the main directions of extent of the installation rail and of the base rail correspond to one another.

The length extent of the installation rail furthermore preferably corresponds to the length extent of the base rail. It is also conceivable for the base rail to be divided into multiple segments and for the installation rail to cover several of the segments. The installation rail could likewise be divided into multiple segments that are arranged on a single base rail. It would however also be possible for both the base rail and the installation rail to be divided into individual segments, wherein the joints between the respective segments could be situated one above the other or offset with respect to one another in the main direction of extent.

The installation surface can be used as a receiving surface on which the objects can be placed in a flush manner. The installation surface could, for mechanical securing purposes, be designed in the manner of a conventional seat rail and, for example, have multiple openings arranged in a pattern, through which openings a fitting in a cavity within the installation rail can be accessed and clamped in the cavity. Other variants are conceivable and could comprise bushings, threaded bores and the like.

A particular aspect of the rail system according to the invention lies in the formation of a lateral intermediate space between the base rail and the installation rail, into which lateral intermediate space a floor panel can be introduced and form-fittingly retained therein. This eliminates the need for expensive production of through bores at the edges of the floor panel and on the installation or base rail. The floor panel can thus be secured particularly easily. Owing to the securing action along the entire edge, force is furthermore introduced not in a punctiform manner but uniformly over an area. The force path is furthermore particularly short and direct.

In a particularly advantageous embodiment, the connecting devices each have a bushing that is couplable to the top side of the base rail and connectable to the installation rail. The bushing is preferably produced from a metallic material and is of cylindrical form. It may furthermore have a collar that produces a form fit with the installation rail. The bushing may set a predetermined spacing between the installation rail and the base rail. By selecting the appropriate axial length and a suitable securing means of the bushing, an adequately strong connection can be created between the two rails. It is preferable to use multiple bushings that are arranged with a predetermined spacing to one another along the longitudinal extent of the rails. The bushing has a cavity into which securing means can extend. The cavity could have an internal thread that corresponds to an external thread of a securing means.

In one advantageous embodiment, the bushing is screwed or riveted to the base rail. The bushing could, for example, comprise an external thread at an end facing toward the base rail, which external thread corresponds with an internal thread in the base rail. It would thus be possible for the bushing to be easily screwed into the base rail such that the cavity of the base rail is freely available to accommodate a securing means. The bushing could be riveted to the base rail by virtue of a suitable device being used to correspondingly crimp the end facing towards the base rail.

In one advantageous embodiment, the installation rail has a bearing surface that can be placed onto the top side of the base rail such that the installation surface is positioned with the predetermined spacing. The installation rail consequently comprises a surface which faces away from the installation surface and which can be placed onto the top side of the base rail. The bearing surface may extend parallel to the installation surface. As a result of the installation rail being placed on, the installation surface assumes a position that is determined by the dimensions of the installation rail. Owing to the direct contact between the bearing surface and the base rail, pressure forces can be transmitted from the installation surface into the base rail. The installation rail may be fixed by way of a form fit and/or a force fit.

In one advantageous embodiment, the installation rail has through bores, which extend through the bearing surface, for the leadthrough of connecting devices for securing the installation rail to the base rail. The securing elements may comprise bolts and/or rivets. The through bores could have a shoulder that forms a bore base for supporting a collar of the securing element or the like. The through bores could furthermore be designed to connect with fittings for the purposes of securing the objects.

In one advantageous embodiment, the installation rail has at least one lateral overhang for forming the at least one lateral intermediate space. The overhang could be formed on a side of the installation rail which faces toward the installation surface. The overhang then, together with the base rail, surrounds the floor panel.

In one advantageous embodiment, the at least one floor panel has at least one arrangement of first form-fit means which are of complementary design with respect to, and aligned with, second form-fit means which are arranged on a side, facing toward the relevant floor panel, of the installation rail and/or of the base rail. The first form-fit means may be a protuberance, a projection, an indentation, a depression, a recess or the like. The second form-fit means is of correspondingly complementary design with respect thereto, and accordingly comprises an indentation, a depression, a protuberance, a projection or the like. The two form-fit means engage with one another and secure the floor panel relative to the installation rail and/or the base rail, such that force can be transmitted in multiple directions.

In one advantageous embodiment, the first form-fit means and the second form-fit means have a toothing. The toothing could be implemented to be parallel or transverse with respect to a main direction of extent of the installation rail or of the base rail. The two form-fit means can accordingly be positioned relatively freely, and the floor panel can be positioned in a more or less finely graduated pattern on the installation rail or base rail and transmit a force transversely with respect to the toothing direction.

In one advantageous embodiment, the first form-fit means and the second form-fit means have protuberances and/or indentations. The floor panel or the corresponding rail could consequently comprise a preferably rounded, domed or frustoconical protuberance that engages with preferably rounded or frustoconical indentations of complementary shape. Automatic positioning of the two form-fit means with respect to one another would be possible by means of a rounded formation or frustoconical shape.

In one advantageous embodiment, the base rail has an omega-shaped profile cross section. The base rail may be formed from a deformed metal sheet or as an assembled component in which two limbs of the profile cross section extend proceeding from the top side and enclose an intermediate space between them. high geometrical moment of inertia is thus realized, as a result of which the base rail exhibits high stability but a low weight. The limbs can be used for being secured on the structural component.

In one advantageous embodiment, the base rail is produced from a metallic material or a plastic. It may be expedient to produce the base rail from an aluminum alloy, titanium, carbon-fiber-reinforced plastic or the like in order to ensure a low weight along with high stability.

In one advantageous embodiment, an interface between the installation rail and the at least one floor panel is liquid-tightly sealed off. There is no need for a separate seal underneath the floor panel.

In one advantageous embodiment, the installation rail has multiple openings for connecting the objects. The installation openings may be formed in bushings that have been described above. If the installation rail comprises through openings, bushings that serve for receiving corresponding connecting means could also be arranged at the through openings.

The invention furthermore relates to a cabin for a vehicle, having at least one object, in particular a seat or a cabin monument, and at least one rail system according to the above description for securing the at least one object in the cabin. The invention furthermore relates to a vehicle, in particular an aircraft, having at least one cabin as described above and/or at least one rail system according to the above description.

BRIEF DESCRIPTION OF THE DRAWINGS

Exemplary embodiments will be discussed in more detail below on the basis of the appended drawings. The illustrations are schematic and not true to scale. The same reference designations are used to denote identical or similar elements. In the drawings.

DETAILED DESCRIPTION OF THE PREFERRED EMBODIMENTS

Figure 1A:
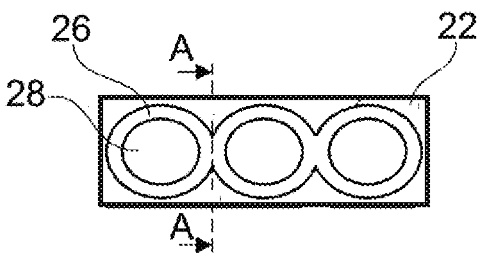
FIG. 1A shows a schematic plan view of a rail system and FIG. 1B shows schematic sectional view of the rail system.
Figure 1B:
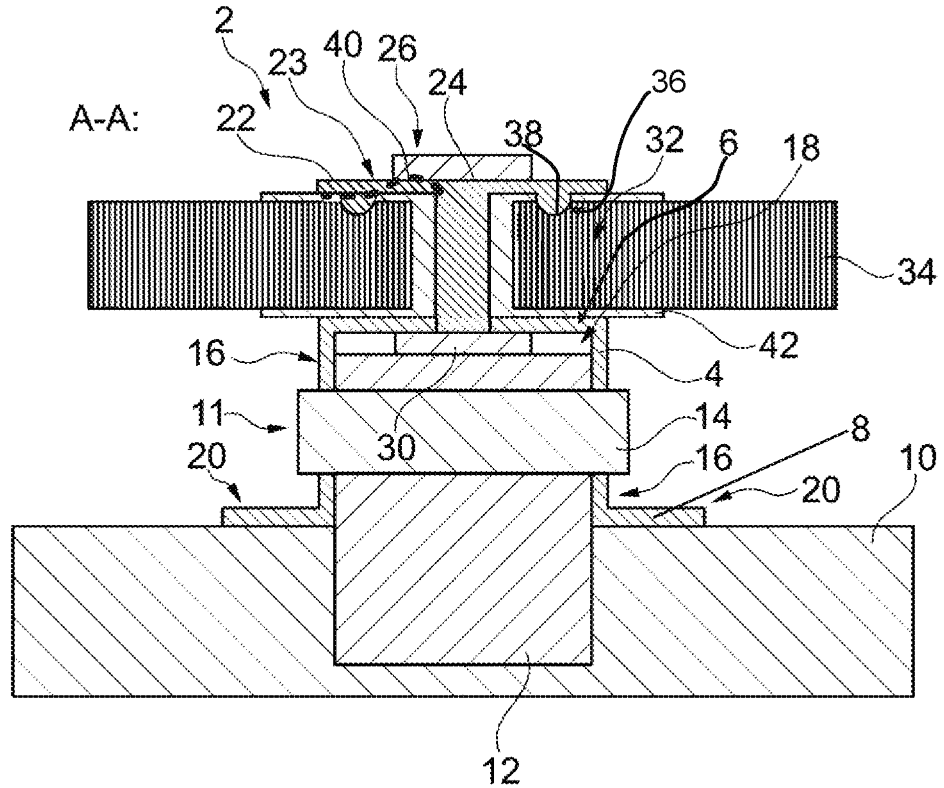

FIGS. 1A and 1B show a rail system 2 for the installation of objects in a cabin of a vehicle. The view in FIG. 1B is a sectional view transversely with respect to a longitudinal extent of the rail system 2 or of the cabin of the vehicle.

In the exemplary embodiment, a base rail 4 is shown which has a top side 6 and a bottom side 8. By way of example, the bottom side 8 lies on a floor beam 10, which is a structural component of the vehicle provided for supporting a floor, and comprises a securing portion 11. Here, the base rail 4 is connected by means of a flange or a lug 12, and a connecting bolt 14, to the floor beam 10. It is self-evident that the base rail 4 is connected to several floor beams 10 which are arranged parallel to and spaced from one another and which are for example distributed along a longitudinal extent of the vehicle. The base rail 4 has an omega-shaped profile comprising two mutually spaced limbs 16 which enclose an intermediate space 18. At a side of the limbs 16 which faces away from the top side 6, there is arranged in each case one collar 20 which extends parallel to the top side 6.

An installation rail 22 is arranged with a spacing to the top side 6, and is supported there by means of connecting devices 24. By way of example, the installation rail 22 has a flat, strip-like structure, the width of which approximately corresponds to the width of the top side 6 of the base rail 4. An installation surface 23 of the installation rail 22, which installation surface projects into the cabin and is utilized for securing purposes, and the top side 6 of the base rail 4 are in this case oriented parallel to one another by way of example. By way of example, the connecting devices 24 are formed as cylindrical bushings with a shell which has an encircling collar 26 and a cavity 28. In FIG. 1, by way of example, the cylindrical bushing 24 is screwed to the top side 6 of the base rail 4 using a nut 30 such that the collar 26 is positioned with a fixed spacing to the top side 6. The installation rail 22 is in areal contact with the collar 26. In this way, a lateral intermediate space 32 is formed between the top side 6 and the installation rail 22, which lateral intermediate space is used to form-fittingly retain a floor panel 34.

The connecting devices 24 could be cohesively connected to the installation rail 22, such that the installation rail 22 introduces loads directly via the connecting devices 24 into the base rail 4 and thus into the structure of the vehicle. Here, by way of example, the installation rail 22 has a smaller thickness than the floor panels 34.

First form-fit means 36 are arranged on a top side of the floor panels 34, which first form-fit means are of complementary design with respect to second form-fit means 38, in the form of protuberances, on the bottom side of the installation rail 22. The securing of the floor panel 34 can thus be improved. It is self-evident that the form-fit means 36 and 38 are arranged, punctiform, in a pattern along the installation rail 22, or extend continuously along the installation rail 22. If the form-fit means are punctiform, a form fit can also be realized in the direction of the longitudinal extent of the installation rail 22.

The arrangement of the floor panel 34 in the lateral intermediate space 32, and the use of the form-fit means 36 and 38, give rise to a particularly short and direct force path 40 between the floor panel 34 and the structure in the form of the rail system 2 and the floor beam 10.

In the lateral intermediate space 32, there is, for example, provided a seal arrangement 42 that seals off the floor panel 34 with respect to the rail system 2. Liquid and dirt on the floor panel 34 thus cannot pass into the lateral intermediate space 32. The seal arrangement 42 could have an elongate seal with a suitable profile which corresponds with a longitudinal edge of the floor panel 34 and in which the floor panel 34 is arranged.

Figure 3:
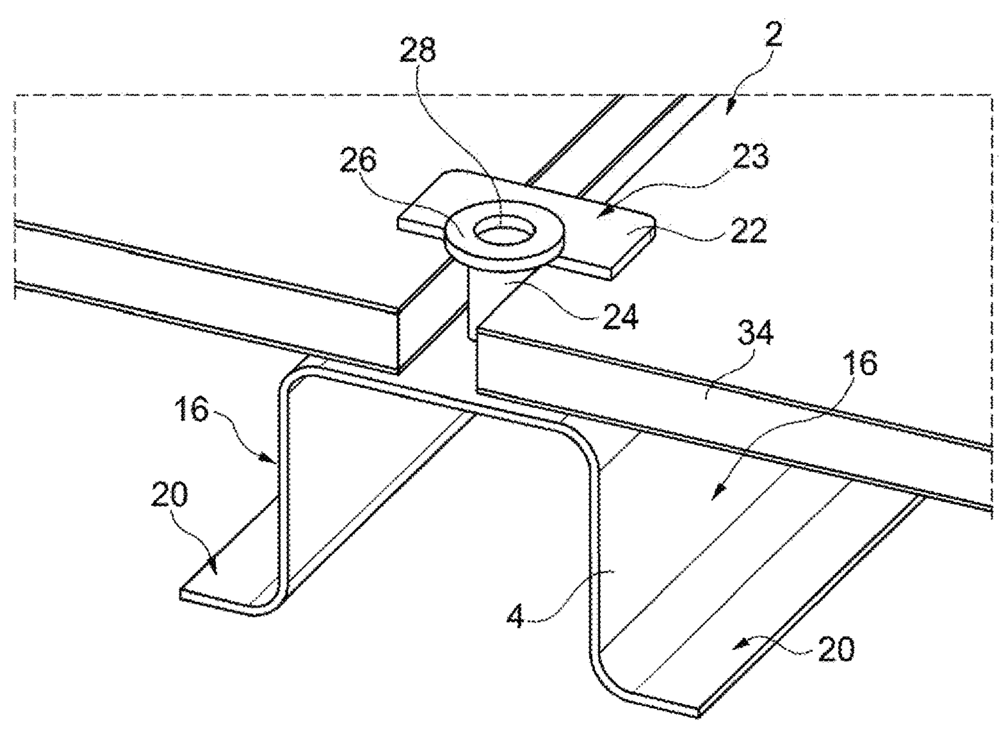
FIG. 3 shows a schematic three-dimensional view of the rail system.
Figure 4:
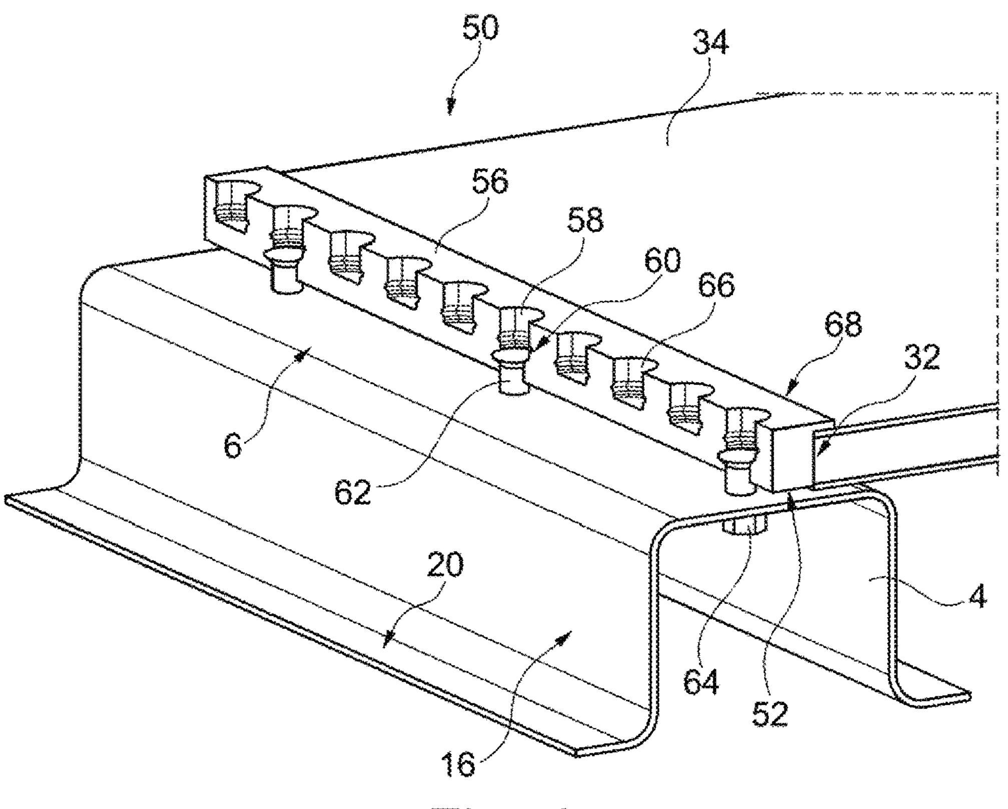
FIG. 4 shows a schematic three-dimensional view of a further exemplary embodiment of the rail system.

FIGS. 3 and 4 show a slight modification of the rail system 2. Here, the connecting device 24 is likewise formed as a bushing, which at a lower end 44 has an external thread 46 that is screwed into a correspondingly shaped internal thread 48 in the base rail 4. There is thus no need for a separate securing element, and the weight of the rail system 2 can be positively influenced. The external thread 46 may be adapted such that the connecting device 24 reaches a predetermined screwing-in depth at which the collar 26 is precisely positioned.

Figure 2A:
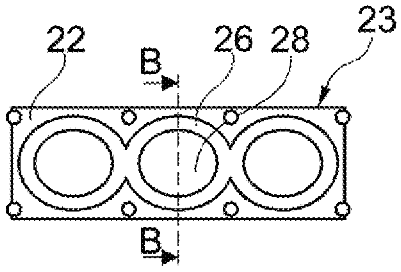
FIG. 2A shows a schematic plan view of the rail system with a modified connecting device and FIG. 2B shows schematic sectional view of the rail system with the modified connecting device.
Figure 2B:
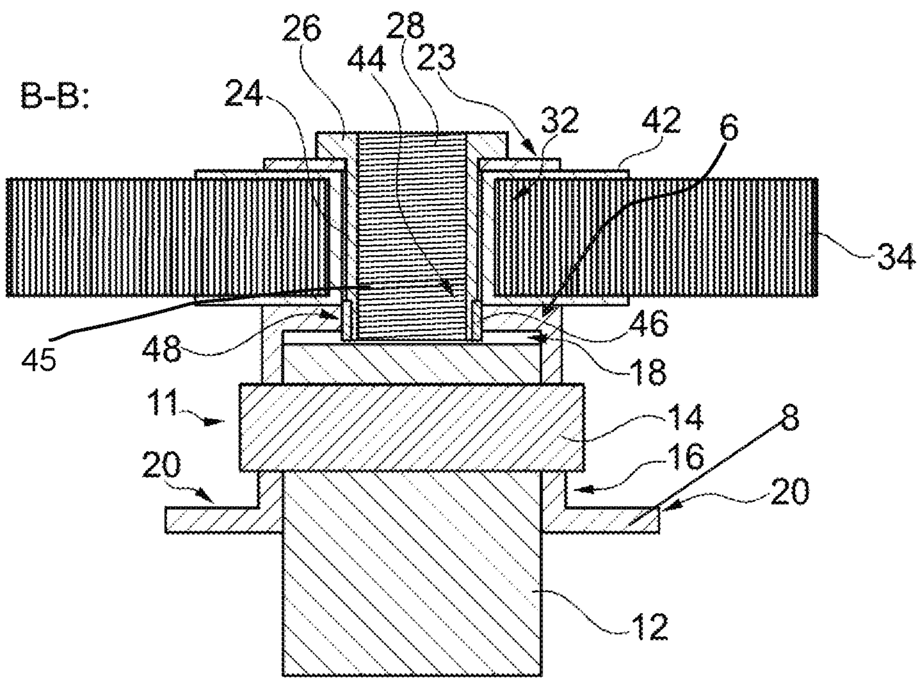

FIG. 3 shows the exemplary embodiment from FIG. 2 in a three-dimensional illustration, in which the omega-shaped structure of the base rail 4 can be clearly seen. The installation rail 22 is merely indicated here for the sake of clarity, but the strip-like structure can be seen. Furthermore, the securing portion 11 of the base rail 4 is not illustrated but corresponds to that of the preceding figures. The base rail 4 may particularly preferably be produced from a metal sheet or from some other deformed, originally planar starting material, for example from a carbon-fiber-reinforced plastic. Rounded edges between individual surface portions of the base rail 4 result in a harmonious, uniform force path. The cavity 28 of the bushings 24 can be used for securing objects, and for this purpose an internal thread 45 could be arranged in the cavity 28.

Figure 5:
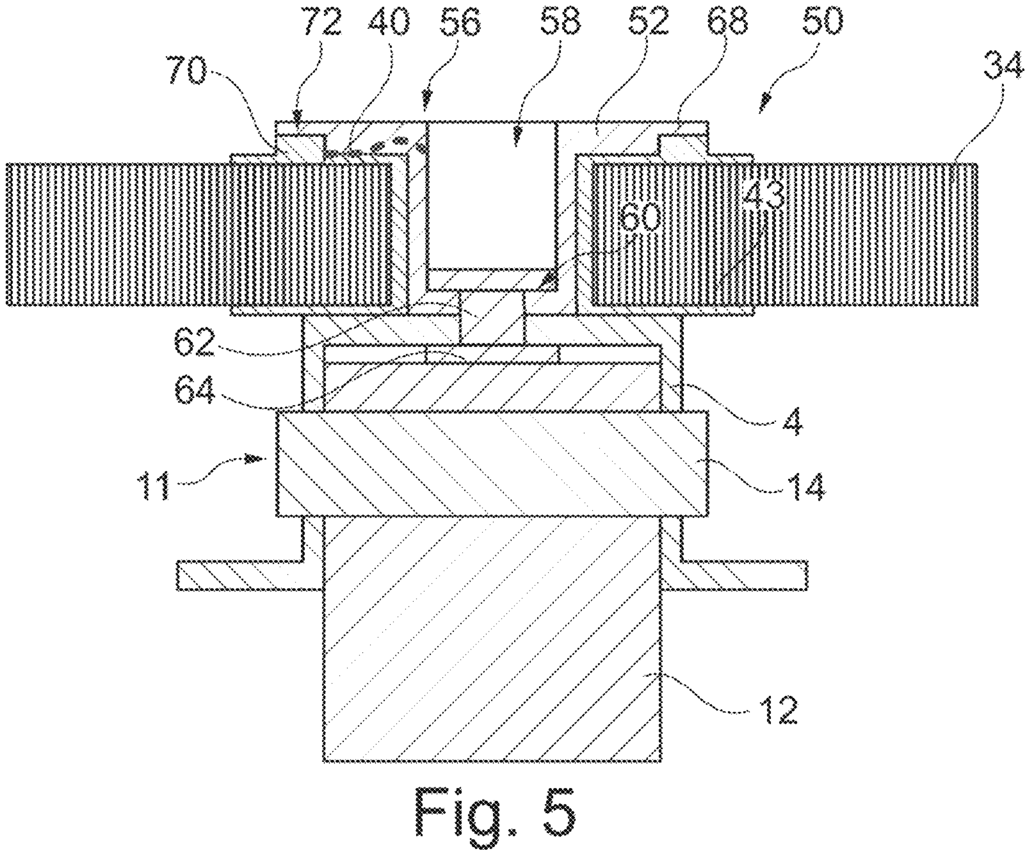
FIG. 5 shows a schematic sectional view of the rail system from FIG. 4.

A further variant is shown in FIGS. 4 to 6 with a rail system 50 which likewise comprises the base rail 4 but comprises a modified installation rail 52. The rail system 50 is shown in FIG. 4 from a three-dimensional perspective, in FIG. 5 in a sectional view, and in FIG. 6 in a sectional view, plan view and detail view. The securing portion 11 of the base rail 4 is not illustrated in FIGS. 4 and 6 but corresponds to that from FIGS. 1 and 2.

The installation rail 52 has a much greater thickness in this example than in the preceding figures. The thickness is in this case greater than the thickness of the floor panel 34. Here, the installation rail 52 has a bearing surface 54 that can be placed directly onto the top side 6 of the base rail 4. An installation surface 56 projects, with a predetermined spacing to the top side 6 of the base rail, over the floor panels 34 arranged on the top side. In order to be secured, the installation rail 52 has a row of through bores 58 which extend all the way through the installation rail 52 and which each have a shoulder 60. Connecting devices 62 in the form of bolts extend through the through bores 58 and lie on the respective shoulder 60. To secure the bolts 62, nuts 64 are provided which are arranged on a side of the base rail 4 which faces away from the relevant bolt 62. Provided between successive through bores 58 are receiving bores 66 which are provided for receiving connecting means for objects that can be placed on the installation surface 56. The receiving bores 66 could have internal threads, detent surfaces or other shape features that are suitable for forming a form-fitting and/or force-fitting connection.

A lateral overhang 68 on the installation surface 56 gives rise to the lateral intermediate space 32 in which the floor panel 34 can be form-fittingly retained. The installation rail 52 may have such an overhang 68 on both lateral sides. The installation rail 52 is preferably axially symmetrical. The through bores 58 and the receiving bores 66 may be arranged in a certain pattern such that the bores 58 and 66 have equal spacings to one another. The pattern could, for example, be an inch-based pattern, such that the bores 58 and 66 have a spacing of one or two inches to one another. It is furthermore conceivable for the through bores 58 to also have, in an upper portion pointing towards the installation surface 56 and analogously to the receiving bores 66, an internal thread or the like in order to allow objects to be secured thereto.

The rail system 50 may likewise have a seal arrangement 69 that may be configured similarly to the seal arrangement 42. The seal arrangement 69 could have projections 70 and depressions 72 which are connectable in form-fitting fashion to one another and which improve the sealing between the floor panel 34 and the base rail 4 or the supporting structure. The projections 70 and depressions 72 may preferably be arranged continuously along the longitudinal extent of the installation rail 52.

Figure 6A:
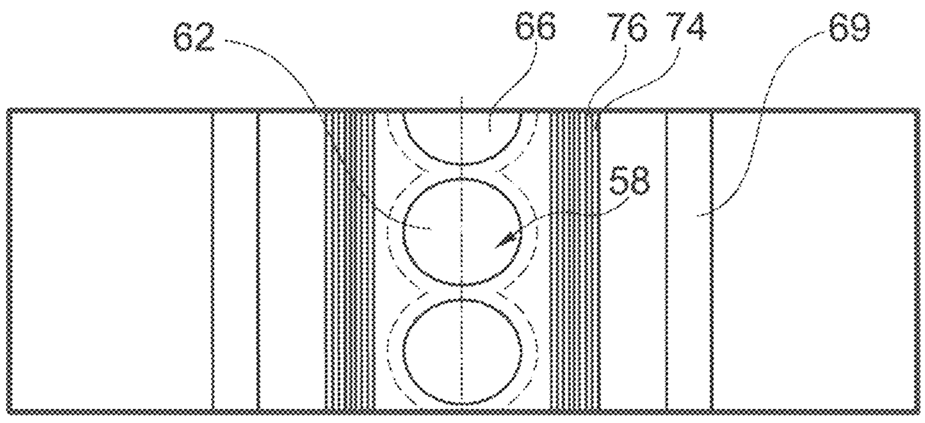
FIG. 6A shows a schematic plan view of the rail system from FIGS. 4 and 5 and FIG. 6B shows a sectional view and a detail view of the rail system from FIGS. 4 and 5.
Figure 6B:
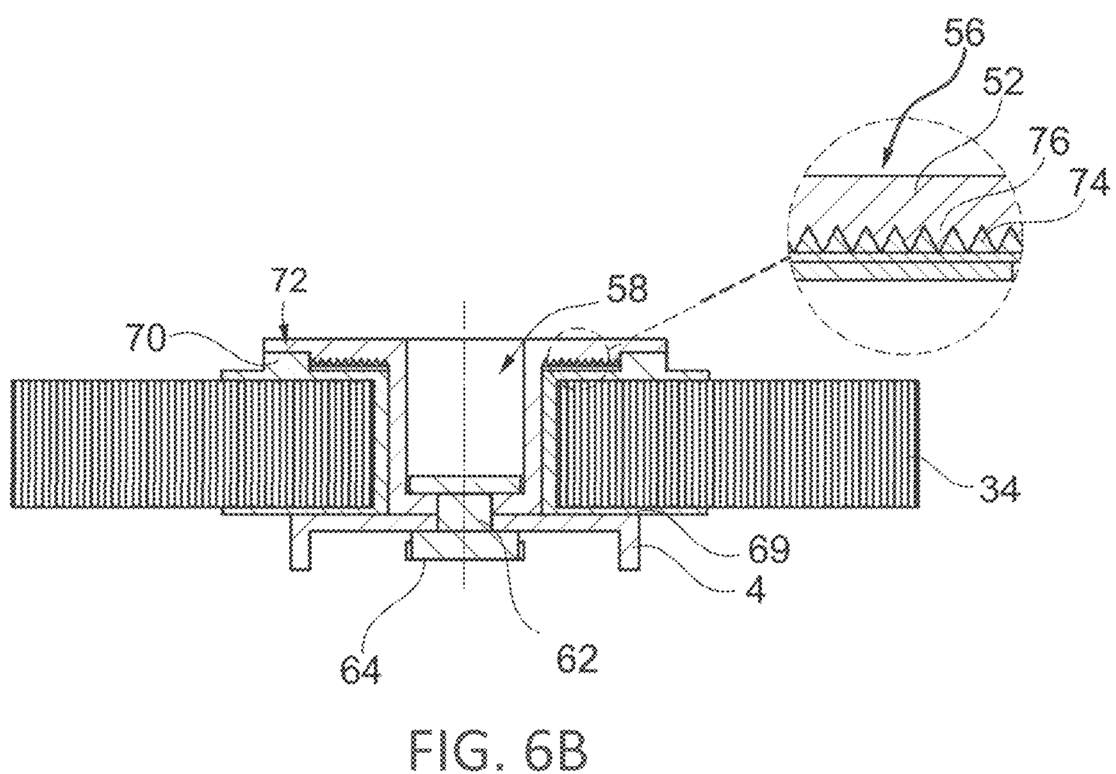

FIGS. 6A and 6B show not only a sectional illustration but also a plan view of the installation surface 56 and a detail view. In the latter, it can be seen that the floor panel 34 has first form-fit means 74 in the form of a first toothing, which points towards the installation surface 56, and the installation rail 52 has a second form-fit means 76 in the form of a second toothing, which points toward the floor panel 34. Here, the toothings are formed parallel to the longitudinal extent of the installation rail 52.

Figure 7A:
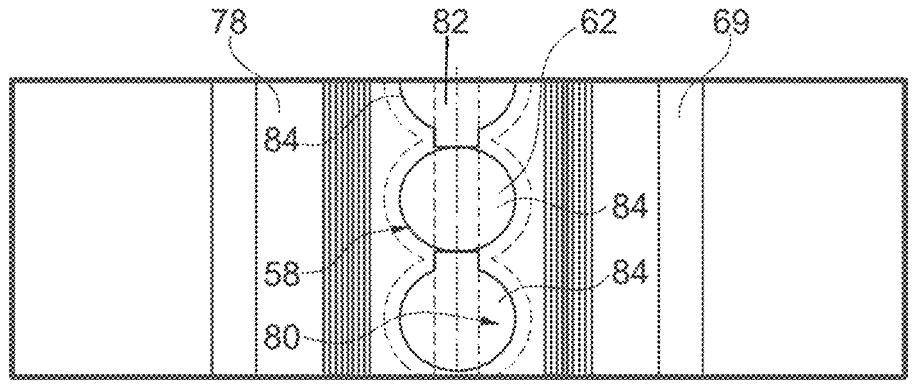
FIG. 7A shows a schematic plan view of the rail system from FIGS. 4 and 5 with a modified installation rail and FIG. 7B shows a sectional view and a detail view of the rail system from FIGS. 4 and 5.
Figure 7B:
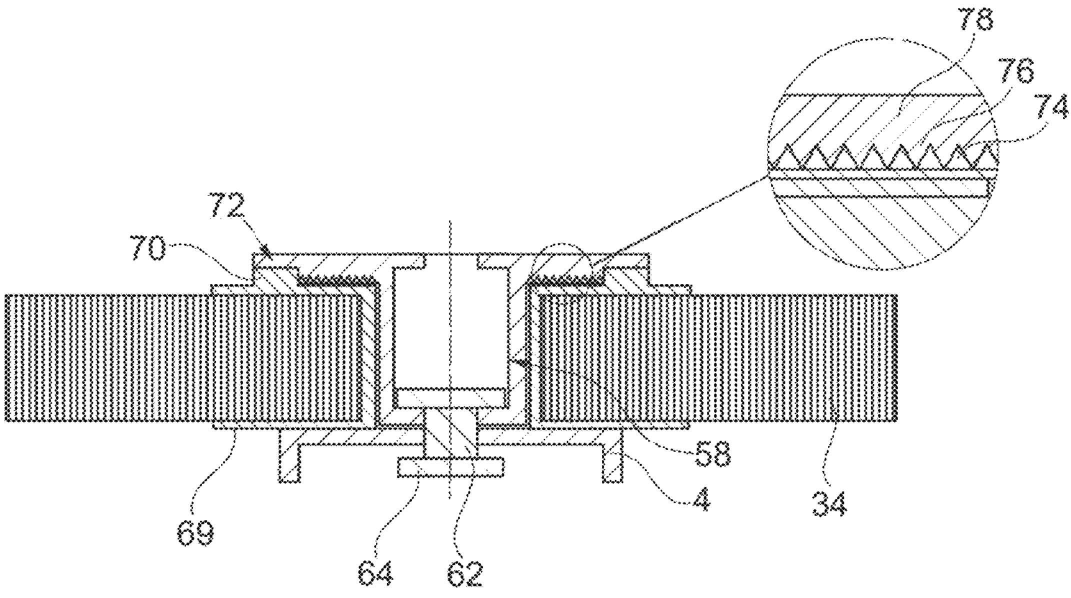

FIG. 7 is a further sectional illustration of the rail system 50, with the illustration here however showing a modified embodiment of an installation rail 78 which, instead of mutually separately arranged through bores 58 and receiving bores 66, has a profile structure corresponding to a conventional seat rail, for example based on a Douglas rail. Here, a cavity 80 is provided which opens outwardly through an elongate slot 82 through which openings 84 extend. Here, the openings 84 may, at least in part, lead to a through bore 58, such that connecting devices 62 for securing the installation rail 78 can be passed through or screwed in and connected to the base rail 4. Here, first form-fit means 74 and second form-fit means 76 are provided, which allow an improved connection of the floor panels 34 to the installation rail 78. In this illustration, too, the securing portion 11 of the base rail 4 is not illustrated for the sake of clarity.

Figure 8:
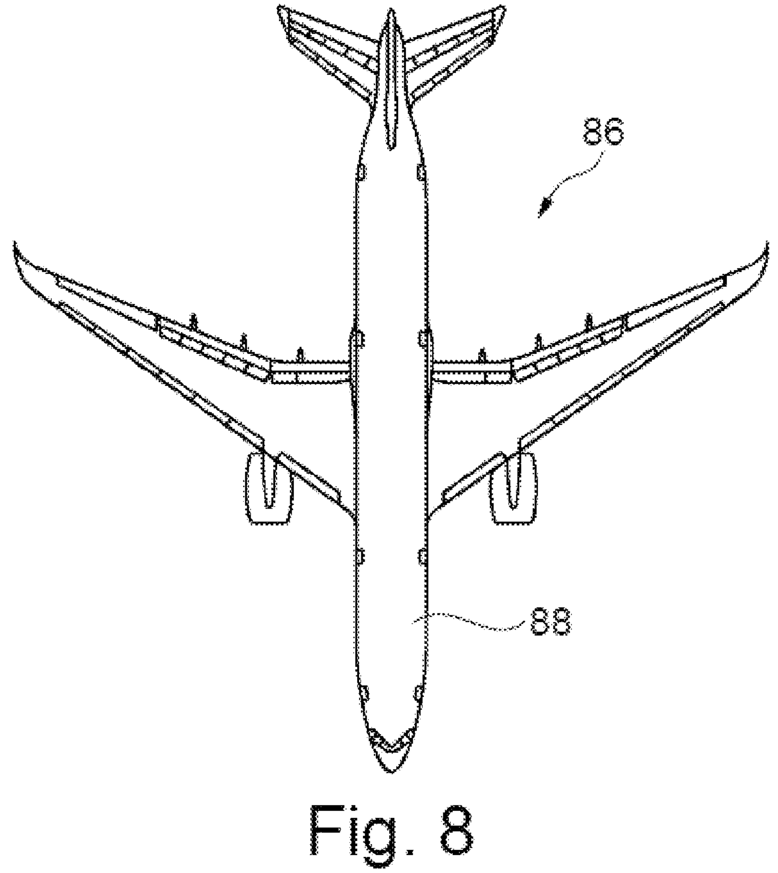
FIG. 8 shows an aircraft.

Finally, FIG. 8 shows an aircraft 86 having a cabin 88 which is formed therein and in which a cabin floor is arranged. This may have a rail system 2 or 50 according to the explanation above, such that passenger seats and/or cabin monuments, for example, can be supported by the rail system. Here, the cabin floor has floor panels 34 that are supported by the rail system 2 or 50.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "having," "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

2 Rail system
4 Base rail
6 Top side
8 Bottom side
10 Floor beam
11 Securing portion
12 Lug/flange
14 Connecting bolt
16 Limb
18 Intermediate space
20 Collar
22 Installation rail
23 Installation surface
24 Connecting device
26 Collar
28 Cavity
30 Nut
32 Lateral intermediate space
34 Floor panel
36 First form-fit means
38 Second form-fit means
40 Force path
42 Seal arrangement
44 Lower end
46 External thread
48 Internal thread
50 Rail system
52 Installation rail
54 Bearing surface
56 Installation surface
58 Through bore
60 Shoulder
62 Connecting device
64 Nut
66 Receiving bore
68 Lateral overhang
69 Seal arrangement
70 Projection
72 Depression
74 First form-fit means
76 Second form-fit means
78 Installation rail
80 Cavity
82 Slot
84 Opening
86 Aircraft
88 Cabin

The invention claimed is:

1. A rail system for an installation of objects in a cabin of a vehicle, having:

a base rail, a floor panel, an installation rail, and connecting devices for connecting the base rail and the installation rail to one another in a mutually parallel orientation, wherein the base rail has a bottom side, with a securing portion for securing the base rail on a structural component of the vehicle, and a top side, wherein the installation rail has an installation surface on which the objects can be mounted and connected to the installation rail via the connecting devices, wherein the rail system is configured to position the installation surface with a predetermined spacing to the top side such that at least one lateral intermediate space is formed between the installation surface and the base rail for purposes of form-fittingly holding the floor panel, and wherein the connecting devices each have a bushing comprising a casing connectable to the installation rail, the casing including a circumferential collar and a cavity, the cavity including internal threads configured for threading engagement with the object being installed on the installation rail, and the circumferential collar being parallel to, and in areal contact with the installation surface of the installation rail, a lower end of the bushing having external threads which are threadedly coupled to the top side of the base rail.

2. The rail system as claimed in claim 1, wherein the bushing is screwed to the base rail.

3. The rail system as claimed in claim 1, wherein the installation rail has a bearing surface that is configured to be placed onto the top side of the base rail such that the installation surface is positioned with the predetermined spacing.

4. The rail system as claimed in claim 3, wherein the installation rail has through bores, which extend through the bearing surface, for the leadthrough of connecting devices for securing the installation rail to the base rail.

5. The rail system as claimed in claim 3, wherein the installation rail has at least one lateral overhang for forming the at least one lateral intermediate space.

6. The rail system as claimed in claim 1, wherein the floor panel has at least one arrangement of first form-fit means which are of complementary design with respect to, and aligned with, second form-fit means which are arranged on a side, facing toward the floor panel, of the installation rail.

7. The rail system as claimed in claim 6, wherein the first form-fit means and the second form-fit means have a toothing.

8. The rail system as claimed in claim 6, wherein the first form-fit means and the second form-fit means have at least one of protuberances or indentations.

9. The rail system as claimed in claim 1, wherein the base rail has an omega-shaped profile cross section.

10. The rail system as claimed in claim 1, wherein the base rail is produced from a metallic material or a plastic.

11. The rail system as claimed in claim 1, wherein an interface between the installation surface and the floor panel is liquid-tightly sealed off.

12. The rail system as claimed in claim 1, wherein the installation rail has multiple openings for connecting the objects.

13. A vehicle having at least one rail system as claimed in claim 1.

14. The vehicle according to claim 13, wherein the vehicle comprises an aircraft.

* * * * *